(No Model.)
H. C. BEEBE.
GRAIN DRILL.
No. 340,190. Patented Apr. 20, 1886.
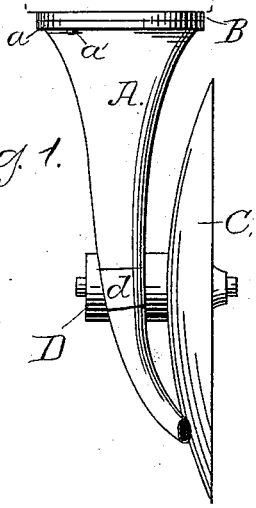
Fig. 1.
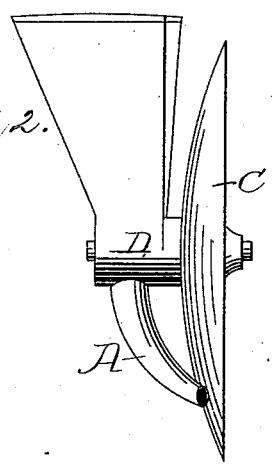
Fig. 2.
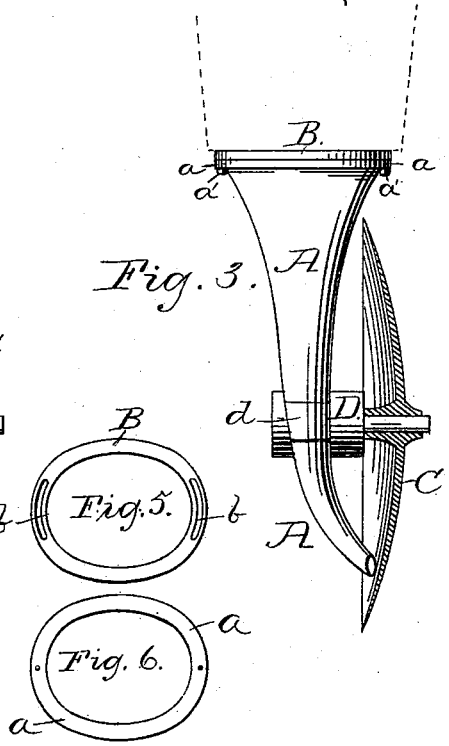
Fig. 3.
Fig. 5.
Fig. 6.
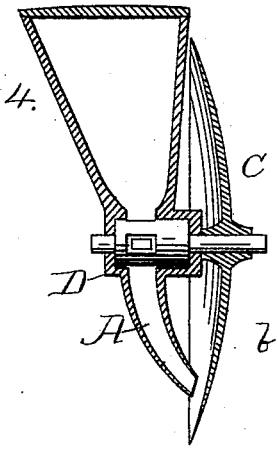
Fig. 4.
Witnesses;
Edward W. Schirach
Edward A. Blake
Inventor;
Henry C. Beebe
By James H. Coyne

UNITED STATES PATENT OFFICE.

HENRY CLAY BEEBE, OF CANTON, ILLINOIS.

GRAIN-DRILL.

SPECIFICATION forming part of Letters Patent No. 340,190, dated April 20, 1886.

Application filed September 22, 1885. Serial No. 177,812. (No model.)

*To all whom it may concern:*

Be it known that I, HENRY CLAY BEEBE, of Canton, in the county of Fulton and State of Illinois, have invented certain new and useful Improvements in Grain-Drills; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to a grain-drill in which a furrow is made by a rotary colter, wherein seed is dropped automatically from a tube leading from a suitable hopper.

In the drawings, Figure 1 is an end elevation. Fig. 2 is an end view of a modification thereof. Fig. 3 is an end view showing the rotary colter in cross-section. Fig. 4 is a transverse vertical section of the said modification, and Figs. 5 and 6 are detail views thereof.

Reference being had to the drawings, A represents a cornucopia-shaped tube, the larger upper end of which is preferably provided with an annular flange, a, of sufficient projection to permit bolt-holes being made in it for the upward passage of suitable bolts, a'. The bolts pass upward through the apertures in flange a, into and through segmental slots b in an elliptical open frame, B, and are provided with suitable nuts on their upper ends. This frame B is secured in and to the bottom of a hopper or seed-box above, as indicated in dotted lines in Figs. 1 and 3, and corresponds in shape to the top of said tube A, as a reference to Figs. 5 and 6 will demonstrate. The object in this construction and arrangement of devices for securing tube A to a seed-box is to maintain the tube in any position it may be oscillated to within the limits of said slots b, for the purpose hereinafter more fully demonstrated. Tube A decreases in diameter toward its bottom or lower end, which is open, and through which the grain is designed to be dropped into a furrow or incision in the soil made by a rotary colter, C. This rotary colter is concavo-convex-shaped, and is fast on the end of a shaft which is journaled in a bearing-box, D, that has a band, d, projecting laterally from it, which surrounds tube A, as shown in the drawings. The convex side of this colter faces the tube A, although, if desired, its position may be reversed and the concave side face the same. If the convex side of the colter should face the said tube, the lower end thereof is bent inward toward said colter and obliquely to the rear, so that the seed which falls into said tube from the seed-box above may drop from the lower open end of the same and be directed into the furrow made in the soil by said colter. On the contrary, if the concave side of said disk-colter should face the tube, the lower end of the latter is turned laterally in toward and into the concavity of said colter, so that the seed may be dropped into the furrow made by the advanced edge of said colter.

In Figs. 2 and 4 are shown modifications of my invention. In these modifications the seed is fed from a hopper into pockets made in an enlargement of shaft C within the bearing-box, which are in register with the opening in the lower end or bottom of the hopper, and which, as said shaft revolves, carries the seed into a tube, the opening of which into said bearing-box is diametrically opposite the opening in the bottom of the hopper, and by the said tube the seed is carried to and dropped into the furrow made by the rotary colter in substantially the same way as in the machines shown in Figs. 1 and 3, hereinbefore fully described. When the position of the colter is reversed, the tube A may be oscillated so that the seed may be dropped in the proper direction.

What I claim as new is—

1. The combination, in a grain-drill, with the hopper and an oscillating tube, A, of the rotary colter.

2. In a grain-drill, the combination, with a tube, A, having an annular flange on its upper end, and annulus or elliptical frame in the bottom of a seed-box having segmental slots, through which pass suitable bolts from said flange to secure the same, of the concavo-convex rotary colter.

3. The combination, in a grain-drill, with a tube, A, having an annular flange, a, and an elliptical frame, B, having segmental slots, through which suitable bolts from the said flange pass to secure the same, of the bearing-box D, band d, surrounding said tube, and concavo-convex colter.

In testimony that I claim the foregoing as my own I hereunto affix my signature in presence of two witnesses.

HENRY CLAY BEEBE.

Witnesses:
E. A. HEALD,
FRANK D. THOMASON.